April 24, 1956      K. F. BRAEUNINGER      2,742,692
BLANK AND METHOD FOR MAKING INTEGRALLY
STIFFENED AIRCRAFT SKIN
Filed March 21, 1952      2 Sheets-Sheet 1
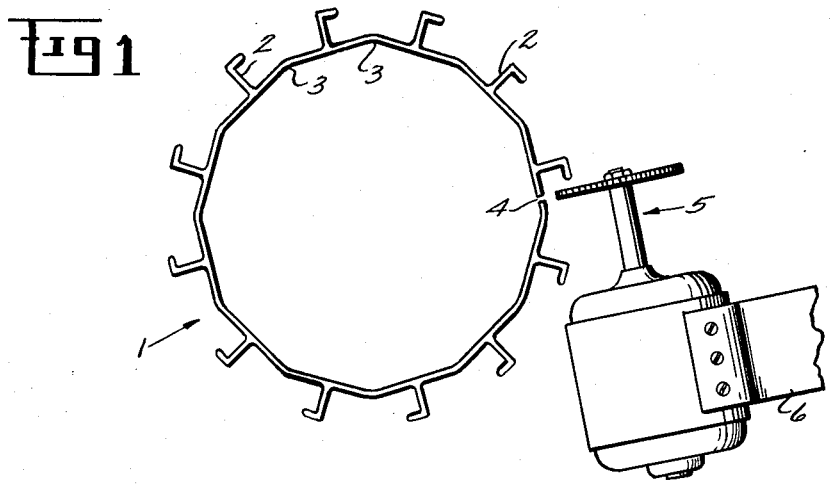
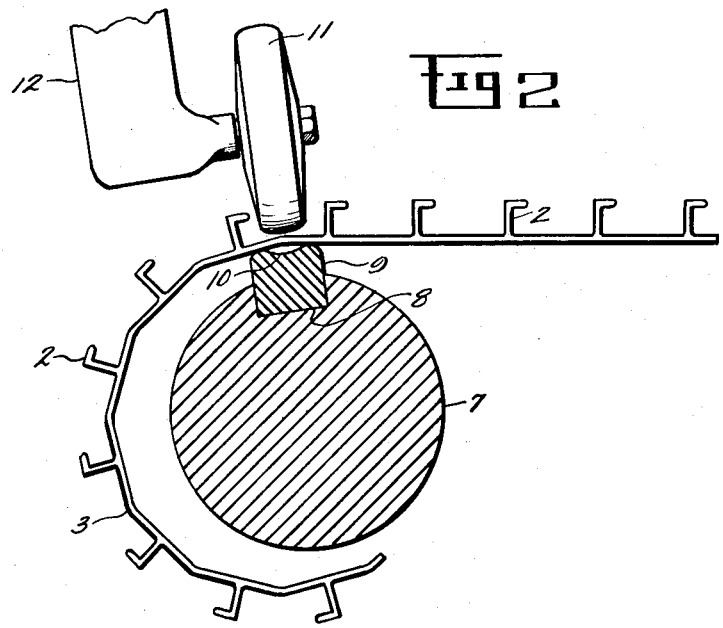
INVENTOR.
KARL F. BRAEUNINGER
BY Charles L. Burgoyne
     AGENT
Wade Koontz
     ATTORNEY April 24, 1956   K. F. BRAEUNINGER   2,742,692
BLANK AND METHOD FOR MAKING INTEGRALLY
STIFFENED AIRCRAFT SKIN
Filed March 21, 1952   2 Sheets-Sheet 2

INVENTOR.
KARL F. BRAEUNINGER

United States Patent Office 2,742,692
Patented Apr. 24, 1956

2,742,692
BLANK AND METHOD FOR MAKING INTEGRALLY STIFFENED AIRCRAFT SKIN

Karl F. Braeuninger, Dayton, Ohio, assignor to the United States of America as represented by the Secretary of the Air Force Application March 21, 1952, Serial No. 277,893

5 Claims. (Cl. 29—548)

(Granted under Title 35, U. S. Code (1952), sec. 266)

The invention described herein may be manufactured and used by or for the United States Government for governmental purposes without payment to me of any royalty thereon.

The present invention relates to an integrally stiffened aircraft skin or panel section blank and to a method for manufacturing the same.

The primary object of the invention is to provide an integrally stiffened metallic aircraft skin made from a tubular extrusion and having a high degree of surface smoothness and continuity after the tubular extrusion has been longitudinally slit and opened out flat.

A further object of the invention is to provide an improved method of manufacturing integrally stiffened metallic aircraft panels or sheet sections in which the first step is to form a tubular extrusion having a generally polygonal cross section with longitudinally extending integral ribs connected to the flat sides of the extrusion, in which the second step is to longitudinally slit the tubular extrusion along one of the flat sides, and in which a series of final and similar steps consist of flattening out each of bends which forms a junction of the adjacent pairs of flat sides of the polygonal extrusions.

The above and other objects of the invention will become apparent upon reading the following detailed description in conjunction with the accompanying drawing, in which:

Fig. 1 is an end view of a completed extrusion after having been cut lengthwise at one point on the periphery thereof by a motor driven saw.

Fig. 2 is an end view partly in cross section of an extrusion as in Fig. 1 after it has been flattened along some of the longitudinally extending bends therein and showing schematically the bend flattening apparatus.

Figure 3:
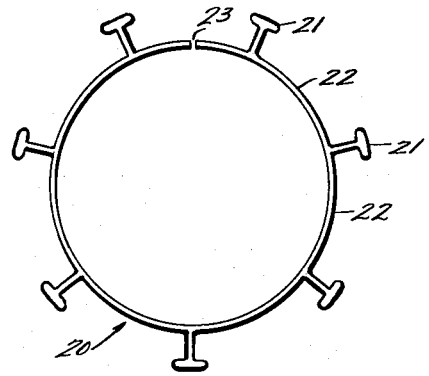
Fig. 3 is an end view of a completed extrusion after having been cut lengthwise at one point on the periphery thereof.

The present invention relates to sheet metal aircraft skin having integral ribs or stiffeners extending therefrom. In making such an aircraft skin section or panel it has been the practice to extrude a tubular section of considerable length from a billet of heated metal, such as aluminum. The extruded tube is made to include integral ribs extending lengthwise of the tube. After the extruded length of tubing is completed, a saw cut or slit is made lengthwise of the tube wall and then the tube is flattened to planar form with the ribs extending from one side face thereof. This final flattening or forming step is the part of the manufacturing process which presents the greatest difficulty, which difficulty is at least partly eliminated by the practice of the present invention.

To consider the present improvement, Fig. 1 of the drawings shows a tubular extrusion 1 of generally polygonal cross section. A plurality of lengthwise ribs 2 project from the outer side of the extrusion and midway between each pair of ribs the tube has a rounded bend therein, as at 3. Between the bends 3 the tube walls are of planar form and the ribs or stiffeners extend from these planar sections approximately at right angles. As the tube is shown in Fig. 1 it has already been extruded and a lengthwise cut, as at 4, has been completed by the use of a motor-driven circular saw 5 suitably supported by a bracket 6 secured to a carriage (not shown). Preferably the saw cut or split is made at one side of a bend 3. The result is a long tube having metal walls of polygonal cross sectional shape with at least one rib connected integrally to the walls between each pair of bends in the walls and with the walls made discontinuous by a single saw cut extending full length of the tube. The corners 3 of the polygonal tube are made rounded rather than sharp.

Finally the tube is opened out into flat or planar form in a manner as shown in Fig. 2. The split tube is mounted over a mandrel 7 which has a lengthwise groove 8 to receive an anvil 9 extending the full length of the mandrel. The outer face of the anvil is hollowed out centrally as at 10 and on each side of the hollow edges are smoothly rounded off. Opposite to the anvil 9 there is provided a flattening roller 11 mounted to turn on an arm or bracket 12 secured to a carriage adapted to travel longitudinally with respect to the mandrel 7. The bends 3 are flattened out one-by-one as the roller is moved along in contact with the bends. As shown in Fig. 2 the tube has already been opened out partly by flattening several of the rounded corners 3. The hollowed out anvil allows the sheet metal to be bent beyond the straight form between the ribs, so that after pressure is relaxed the bends will spring back to a straight-angle relation. Each of the separate bends are straightened out in succession until the whole tube has been flattened. In some cases the panel may require an additional roll straightening operation simultaneously applied to the entire width of the panel. A stretching operation may follow for longitudinal straightening. The final form of the panel may be curved or flat as determined by the portion of the aircraft to be covered by a particular panel. As will be understood the integral ribs 2 always extend toward the interior of the aircraft structure when the skin panels have been formed and attached to the aircraft frame.

Figure 4:
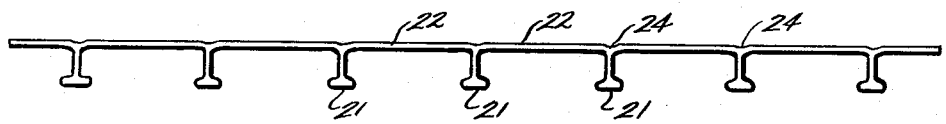
Fig. 4 is an end view of an extrusion as in Fig. 3 after it has been flattened to remove as much of the curvature as is commercially feasible.
Figure 5:
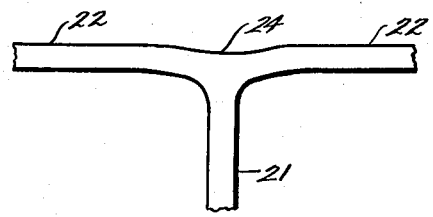
Fig. 5 is an enlarged end view of a fragment of the flattened extrusion taken at the intersection of a laterally extending rib and the skin itself.

In order to more clearly demonstrate the inherent advantages of the present integrally stiffened aircraft skin, Figs. 3 to 5 have been added to show another and commoner integrally stiffened aircraft skin. In Fig. 3 there is shown a tubular extrusion 20 of metal including radially disposed integral ribs 21 having uniformly curved wall sections 22 therebetween. At 23 one wall section is slit lengthwise in order to permit subsequent unrolling or flattening of the tube 20. However in accomplishing this step in the manufacture by rolling or pressing it has been found that the curved walls are so stiff adjacent to the integral ribs that flattening along these narrow zones can not be readily accomplished. Furthermore the very presence of the integral ribs interferes with the tools to be applied in flattening the curved wall sections. The result is that the flattened out panel section has very shallow valleys or dips 24 in the sheet or skin section opposite to each integral rib or stiffener 21. The resulting panel or section thus will have these slight corrugations instead of being smooth and co-planar. A magnified view of the dip 24 adjacent to one rib 21 is shown in Fig. 5. Another disadvantage in having uniformly curved wall sections 22 between the ribs 21 is that flattening must be accomplished uniformly over an extensive surface area and this is more difficult to accomplish than to merely straighten out a series of sharp bends. After a uniformly curved section has been flattened by mating rollers or platens having straight sheet engaging faces, the section will always tend to spring back when pressure thereon has been relieved. The enlarged fragmentary end view as in Fig. 5 shows clearly that the curved wall material on both sides of the rib 21 and immediately adjacent thereto is depressed below the major portion of the flattened wall sections 22, thus illustrating that the desired flattening of the slit tube is not complete. This tendency for the wall sections adjacent to the ribs to retain their original curvature is natural, since the moment of inertia with respect to the axis of the bending moment is considerably increased by the ribs.

The specific arrangement of the ribs and relative spacing thereof may vary widely and the number and relative size of the flat sides of the polygonal extrusion may be changed as desired. Also it is to be understood that panels of general utility may be made from the polygonal extrusions with ribs on one or both sides and spaced in any convenient or desired manner as long as such ribs extend only from flat portions of the extrusion, so that the ribs will not interfere with the tube flattening steps applied after the tubular extrusion is formed and slit.

The embodiment of the invention herein shown and described is to be regarded as illustrative only and it is to be understood that the invention is susceptible of modifications, variations and changes within the scope of the appended claims.

I claim:

1. An extruded metallic blank for integrally reinforced aircraft skin of generally polygon cross sectional shape comprising, a series of flat wall portions integrally connected by rounded bends to form a tube of substantially equilateral polygonal cross section, and wall stiffening ribs integrally connected to said flat wall portions centrally and extending lengthwise thereof.

2. An extruded metallic blank for integrally reinforced aircraft skin of generally polygon cross sectional shape comprising, a series of flat wall portions integrally connected by rounded bends to form a tube of substantially equilateral polygonal cross section, a stiffening rib integrally connected to each of said wall portions midway between each pair of adjacent rounded bends and extending lengthwise of the wall portions and a slit at one of said bends extending lengthwise of said blank.

3. A method of making a metallic sheet integrally stiffened by parallel ribs comprising, extruding a quantity of metal to provide an extrusion of generally equilateral polygonal cross sectional shape having integral ribs extending from the flat sides of the extrusion centrally thereof slitting through the wall of said extrusion throughout the length of said extrusion and along a straight line, and flattening the corners of said extrusion on a concave mandrel to bring the flat sides of the extrusion into coplanar relation whereby a minimum stress obtains in said sheet.

4. A method of making a metallic sheet integrally stiffened by parallel ribs comprising, extruding a quantity of metal to provide an extrusion of generally equilateral polygonal cross sectional shape having integral ribs extending from the flat sides of said extrusion intermediate and lengthwise thereof, slitting through the wall of said extrusion throughout the length of said extrusion, and subjecting each bend in such extrusion to a roller and a concave mandrel applied to the respective sides thereof to bring the flat sides of the extrusion into coplanar relation with a minimum of stress.

5. A method of making a sheet integrally stiffened by parallel ribs comprising, extruding a quantity of material to provide an extrusion of generally polygonal cross sectional shape having an integral rib extending from each of the flat sides of said extrusion intermediate and lengthwise thereof slitting through the wall of said extrusion throughout the length of said extrusion intermediate one pair of adjacent flat sides thereof and subjecting each of the corners of said extrusion throughout its length to a concave mandrel and a planar working surface to bring the flat sides of the extrusion into coplanar relation with a minimum of stress.

References Cited in the file of this patent

UNITED STATES PATENTS

| | | |
|---|---|---|
| 837,707 | Mouterde | Dec. 4, 1906 |
| 926,253 | Hyde | June 29, 1909 |
| 1,032,907 | Hyde | July 6, 1912 |
| 1,521,065 | Barme | Dec. 30, 1924 |
| 1,816,594 | Ledwinka | July 28, 1931 |
| 1,891,740 | Westerman | Dec. 20, 1932 |
| 2,037,608 | Walker | Apr. 14, 1936 |
| 2,066,186 | Mitchell | Dec. 29, 1936 |
| 2,353,845 | Mursch | July 18, 1944 |
| 2,458,686 | Davie | Jan. 11, 1949 |

FOREIGN PATENTS

| | | |
|---|---|---|
| 584,593 | Germany | Sept. 21, 1933 |